United States Patent
Li et al.

(10) Patent No.: US 12,434,332 B2
(45) Date of Patent: Oct. 7, 2025

(54) HIGH HARDNESS STEEL RACE WELDED TO A CARBURIZED STEEL SHAFT AND A METHOD OF WELDING THE SAME

(71) Applicant: GM Global Technology Operations LLC, Detroit, MI (US)

(72) Inventors: Huaxin Li, Rochester Hills, MI (US); Yi Liu, Troy, MI (US); Sen Jiang Zhou, Troy, MI (US); Jack M. Gayney, Grosse Ile, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 232 days.

(21) Appl. No.: 18/299,223

(22) Filed: Apr. 12, 2023

(65) Prior Publication Data

US 2024/0342836 A1 Oct. 17, 2024

(51) Int. Cl.
| | |
|---|---|
| *B23K 31/00* | (2006.01) |
| *B23K 26/242* | (2014.01) |
| *B23K 31/02* | (2006.01) |
| *B23K 101/00* | (2006.01) |

(52) U.S. Cl.
CPC ............ *B23K 31/02* (2013.01); *B23K 26/242* (2015.10); *B23K 31/003* (2013.01); *B23K 2101/005* (2018.08); *B23K 2101/008* (2018.08)

(58) Field of Classification Search
CPC .... B23K 31/02; B23K 26/242; B23K 31/003; B23K 2101/008; B23K 2101/005
See application file for complete search history.

(56) References Cited

U.S. PATENT DOCUMENTS

| | | | | | |
|---|---|---|---|---|---|
| 3,791,706 | A | * | 2/1974 | Dobson | B21H 1/12 |
| | | | | | 74/431 |
| 6,478,016 | B1 | * | 11/2002 | Roderique | F02B 39/04 |
| | | | | | 415/199.1 |
| 6,485,188 | B1 | * | 11/2002 | Dougherty | B60B 35/121 |
| | | | | | 384/537 |
| 6,993,844 | B2 | * | 2/2006 | Toda | F16C 19/186 |
| | | | | | 29/894.362 |
| 8,747,275 | B2 | * | 6/2014 | Shioiri | F16H 48/08 |
| | | | | | 74/606 R |
| 10,160,060 | B2 | * | 12/2018 | Li | B23K 26/323 |
| 10,871,192 | B2 | * | 12/2020 | Brogna | F16C 35/063 |
| 2008/0219834 | A1 | * | 9/2008 | Merfeld | F16C 39/02 |
| | | | | | 310/400 |
| 2011/0049109 | A1 | * | 3/2011 | Weeber | C23C 30/00 |
| | | | | | 228/178 |

(Continued)

*Primary Examiner* — Zakaria Elahmadi
(74) *Attorney, Agent, or Firm* — Vivacqua Crane, PLLC (57) ABSTRACT

A gear box having a carburized shaft and steel bearing assembly. The bearing includes an inner-race and an outer-race. The shaft includes a distal end surface extending perpendicularly from a shaft faying surface and a shaft annular beveled edge. The shaft faying surface is in intimate contact with the inner-race. The inner-race second annular face is coplanar with the distal end surface. The shaft annular beveled edge cooperates with the inner-race faying surface to define a half-V shaped groove. An annular weld joint is formed in the half-V shaped groove thereby joining the shaft to the inner-race. The outer-race includes a first width (W1) and the inner-race includes a second width (W2). W2 is wider than W1 by greater than 0 millimeters (mm) to about 10 mm.

20 Claims, 7 Drawing Sheets

(56) References Cited

U.S. PATENT DOCUMENTS

| | | | |
|---|---|---|---|
| 2011/0150381 A1* | 6/2011 | Matsumoto | B23K 11/36 29/898.062 |
| 2012/0070110 A1* | 3/2012 | Owens | F16F 1/34 29/893 |
| 2013/0077192 A1* | 3/2013 | Kosaka | F16C 35/06 29/898.04 |
| 2018/0215200 A1* | 8/2018 | Trost | B60K 17/36 |
| 2020/0246917 A1* | 8/2020 | Li | B23K 26/21 |

* cited by examiner

HIGH HARDNESS STEEL RACE WELDED TO A CARBURIZED STEEL SHAFT AND A METHOD OF WELDING THE SAME

INTRODUCTION

The present disclosure relates to a vehicle gear box having a rotatable shaft supported by rolling-element bearings, more specifically to a rolling-element bearing having a high hardness steel race welded to a carburized steel shaft and a method of welding the same.

Vehicles having conventional internal combustion (IC) engines, electric vehicles having electric engines, and hybrid vehicles having both IC and electric engines utilize gear boxes, also known as transmissions, to transmit torque from the engines to one or more drive wheels for propelling the vehicles. An exemplary gear box includes one or more torque transfer shafts rotatably supported by rolling-element bearings. A rolling-element bearing carries a rotatable load by having rolling elements such as steel ball bearings or steel cylindrical bearings disposed between two concentric grooved rings, which are referred to as an outer race and an inner-race.

In one example of a gear box, the outer race is attached to a housing and the inner-race is attached to an end of the torque transfer shaft so that the torque transfer shaft is rotatable with respect to the housing. The torque transfer shaft is a carburized steel shaft and the inner bearing is formed of a high strength steel. Due to the differences in materials and mechanical properties of the torque transfer shaft and the inner-race, these two components are fastened together by mechanical fasteners such as bolts, nuts, screws, and the likes.

While mechanical fasteners are useful for their intended purpose in attaching the high hardness steel inner-race to the carburized steel shaft, there is continued need to improve the durability and reliability of joining the inner-race to the shaft while also simplifying manufacturing and decreasing overall vehicle weight.

SUMMARY

According to several aspects, a gear box for a vehicle is provided. The gear box includes a housing having a shaft rotatably supported by a rolling-element bearing. The shaft is a carburized shaft having a shaft faying surface. The rolling-element bearing includes an inner-race having an inner-race first annular face, an inner-race second annular face opposite the inner-race first annular face, and an inner-race faying surface connecting the inner-race first annular face to the inner-race second annular face. The inner-race is formed of a high-strength steel. The outer-race includes an outer-race first annular face, an outer-race second annular face opposite the outer-race first annular face, and an outer-race faying surface connecting the outer-race first annular face to the outer-race second annular face. The outer-race is concentric with the inner-race and the outer-race faying surface is joined to the housing. The shaft includes a shaft faying surface, a distal end surface extending perpendicularly from the shaft faying surface, and a shaft angled surface extending from the shaft faying surface to the distal end surface to define a shaft annular beveled edge. The shaft faying surface is in tight intimate contact with the inner-race faying surface, and the inner-race second annular face is coplanar with the distal end surface. The shaft annular beveled edge cooperates with the inner-race faying surface to define a half-V shaped groove. An annular weld joint is formed in the half-V shaped groove thereby joining the shaft to the inner-race.

In an additional aspect of the present disclosure, the outer-race first annular face is coplanar with the inner-race first annular face. The outer-race includes a first width (W1) and the inner-race includes a second width (W2). W2 is greater than W1 by greater than 0 millimeters (mm) to about 10 mm.

In another aspect of the present disclosure, the rolling-element bearing further includes a rolling element disposed between the outer-race and the inner-race, wherein the rolling element includes a geometric center, a first distance (D1) between the geometric center to the outer-race second annular face, and a second distance (D2) between the geometric center to the inner-race second annular face. D2 is greater than D1 by greater than 0 mm to 10 mm.

In another aspect of the present disclosure, the shaft annular beveled edge cooperates with the inner-race annular beveled edge to define a V-shaped groove. A weld joint formed in the V-shaped groove thereby joining the shaft to the inner-race. The V-shaped groove includes a depth of about 1 mm to about 5 mm and a width of greater than 0 to about 3 mm.

In another aspect of the present disclosure, the weld joint includes a plurality of uniformly circumferentially spaced weld segments formed in a predetermined sequence configured to minimize weld stress and potential distortion of the rolling-element bearing.

In another aspect of the present disclosure, the inner-race is formed of a high hardness steel and the shaft is a carburized shaft.

According to several aspects, a method of welding a rolling-element bearing to a shaft is provided. The method includes providing a shaft rotatable about an axis-A, wherein the shaft includes an annular surface perpendicular to the axis-a, an external cylindrical surface extending from the annular surface in a direction parallel to the axis A, a distal end surface extending from the external surface parallel to the annular surface, and an angled surface extending from the external cylindrical surface to the distal end surface to define a shaft annular beveled edge; providing a rolling-element bearing having an inner-race having an external surface defining an first annular face, a second annular face opposite the annular first face, and an inner-race faying surface connecting the first annular face to the second annular face; and assembly the rolling-element bearing to the shaft such that the inner-race faying surface is in intimate contact with the external cylindrical surface of the shaft and the second annular surface of the inner-race is coplanar with the distal end surface of the shaft, wherein the shaft annular beveled edge cooperates with the out race faying surface to define a half-V shaped groove; and forming a weld joint in the annular half-V shaped groove to join the shaft to the inner-race.

In an additional aspect of the present disclosure, forming the weld joint in the annular half-V shaped groove includes fusing a welding alloy having greater than 10 percent by weight of nickel.

In another aspect of the present disclosure, the inner-race further includes an angled surface extending from the inner-race faying surface to the inner-race second annular face to define an inner-race beveled edge. The inner-race beveled edge cooperates with the shaft annular beveled edge to define an annular V-shaped groove. Forming the weld joint includes forming the weld joint in the annular V-shaped groove.

In another aspect of the present disclosure, the shaft includes a carburized outer layer. The method further includes removing a portion of the carburized outer layer to define the shaft annular beveled edge prior to assembling the rolling-element bearing to the shaft.

In another aspect of the present disclosure, forming the weld joint in the annular V-shaped groove further includes forming a plurality of equally spaced weld segments in a criss-crossing sequence configured to minimize weld stress and potential distortion of the rolling-element bearing.

According to several aspects, a shaft-bearing assembly is provided. The assembly includes a carburized steel shaft rotatable about an axis-A, wherein the shaft includes an external faying cylindrical shaft surface extending in a direction parallel to the axis-A, a distal end shaft surface extending from the external faying cylindrical shaft surface in a direction perpendicular to the axis-A, and an angled shaft surface extending from the external faying cylindrical surface to the distal end shaft surface to define an annular beveled shaft edge. The annular beveled shaft edge is free of a carburized layer. The assembly further includes a rolling-element bearing having an inner-race having an external surface defining an first annular face, a second annular face opposite the first annular face, and an inner-race faying surface connecting the first annular face to the second annular face, wherein the inner-race comprises of a high-strength steel. The inner-race faying surface is in intimate contact with the external faying cylindrical shaft surface and the second annular surface of the inner race is coplanar with the distal end shaft surface. The annular beveled shaft edge cooperates with the inner-race faying surface to define a half-V shaped annular groove. A weld joint is formed in the annular half-V shaped groove joining the shaft to the inner-race.

In an additional aspect of the present disclosure, the rolling-element bearing further includes an outer-race having an external surface defining an first annular face, a second annular face opposite the first annular face, and an outer-race faying surface connecting the first annular face to the second annular face. The outer-race is co-axial with the inner-race. The second annular face of the inner-race extends in a direction parallel to the axis-A by a distance (d) greater than second annular face of the outer-race, wherein the distance (d) is greater than 0 millimeters (mm) to 10 mm.

In another aspect of the present disclosure, the first annular face of the outer-race is co-planar with the first annular face of the inner-race.

In another aspect of the present disclosure, the rolling-element bearing further includes a rolling element is disposed between the inner-race and the outer-race, wherein rolling element includes a geometric center. The outer-race includes a first distance (D1) measured in an axial direction parallel with the axis-A from the geometric center of the rolling element to the second annular face of the outer-race. The inner-race includes a second distance (D2) measured in the axial direction parallel with the axis-A from the geometric center of the rolling element to the second annular face of the inner-race. D2 is greater than D1 by greater than 0 millimeters to 10 millimeters.

In another aspect of the present disclosure, the inner-race includes an angled inner-race surface extending from the inner-race faying surface to the inner-race second annular face to define an annular beveled inner-race surface. The annular beveled inner-race surface cooperates with the annular beveled shaft edge to define an annular V-shaped groove. A plurality of equality spaced weld joints formed in the V-shaped annular groove to join the shaft to the inner-race of the rolling-element bearing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
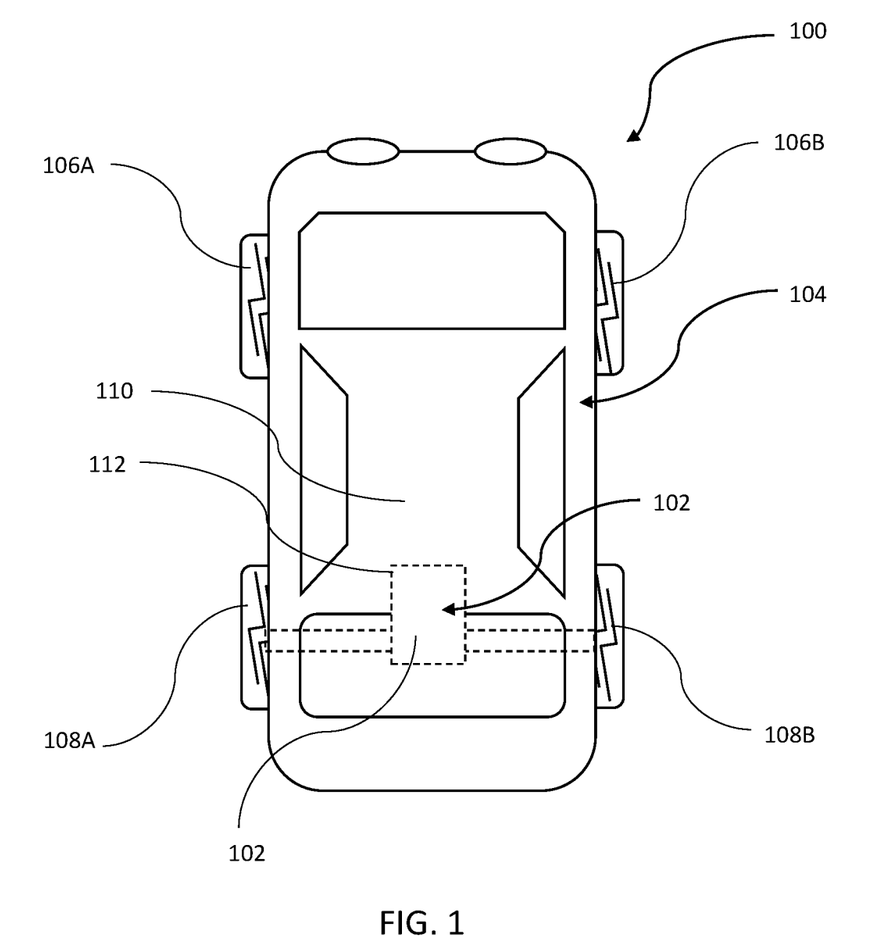
FIG. 1 is a diagram of a plan view of an electric vehicle having an electric drive unit (EDU), according to an exemplary embodiment.

FIG. 1 is a diagrammatic illustration of an electric vehicle 100 having an Electric Drive Unit (EDU) 102. The vehicle 100 generally includes a body 104 having front wheels 106A, 106B and rear wheels 108A, 108B. The front wheels 106A, 106B and the rear wheels 108A, 108B are each rotationally located near a respective corner of the body 104.

Figure 2:
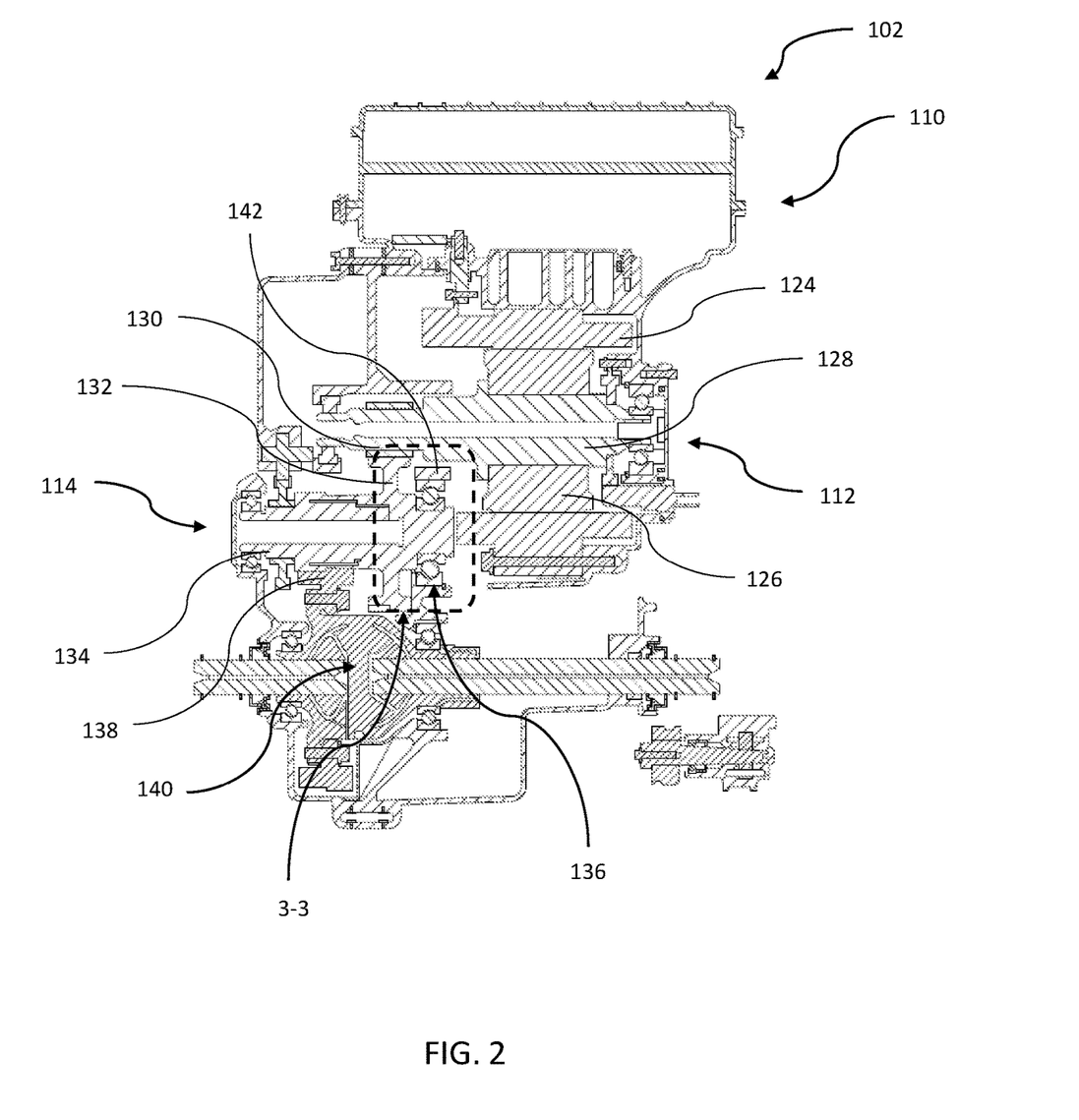
FIG. 2 is an illustration of a cross-sectional view of the EDU having a torque transfer shaft supported by rolling-element bearings, according to an exemplary embodiment.

FIG. 2 is an illustration of a cross-sectional view of the EDU 102. The EDU 102 includes three (3) modules: a power electronics 110, an electric motor 112, and a gear box 114, also referred to as a transmission 114. The power electronics 110 are responsible for the conversion of DC voltage from rechargeable batteries (not shown) into a three-phase AC voltage for the overall operation and control of the electric motor 112. The electric motor 112 converts electrical energy into mechanical torque, which is transmitted through the gear box 114 to one or more of the wheels 106A, 106B, 108A, 108B for propelling the vehicle 100.

In the exemplary embodiment of the EDU 102 shown, the electric motor 112 includes a stator 124, a rotor 126 rotatable with respect to the stator, a rotor shaft 128 splined to the rotor, and a first gear member 130 splined to the rotor shaft 128. The first gear member 130 is meshed to a second gear member 132 splined to a torque transmittal shaft 134. The torque transmittal shaft 134 is rotatably supported by rolling-element bearings 136. The torque transmitting shaft 134 includes a third gear member 138 meshed to a torque distribution gear mechanism 140, also referred to as a differential unit 140.

In operation, the electric motor 112 generates a torque output through rotor shaft 128. The torque transmittal shaft 134 then conveys the torque from the rotor shaft 128 to the differential unit 140, which then selectively distributes the torque to one or more of the vehicle wheels 106A-B, 108A-B to propel the vehicle 100. The torque transmittal shaft 134 is a carburized steel shaft 134 in which carbon atoms are diffused into an outer layer of a low carbon steel core shaft 134 during a heat treatment process to increase the surface hardness for wear resistance while retaining the toughness and ductility of the low carbon steel.

Figure 3:
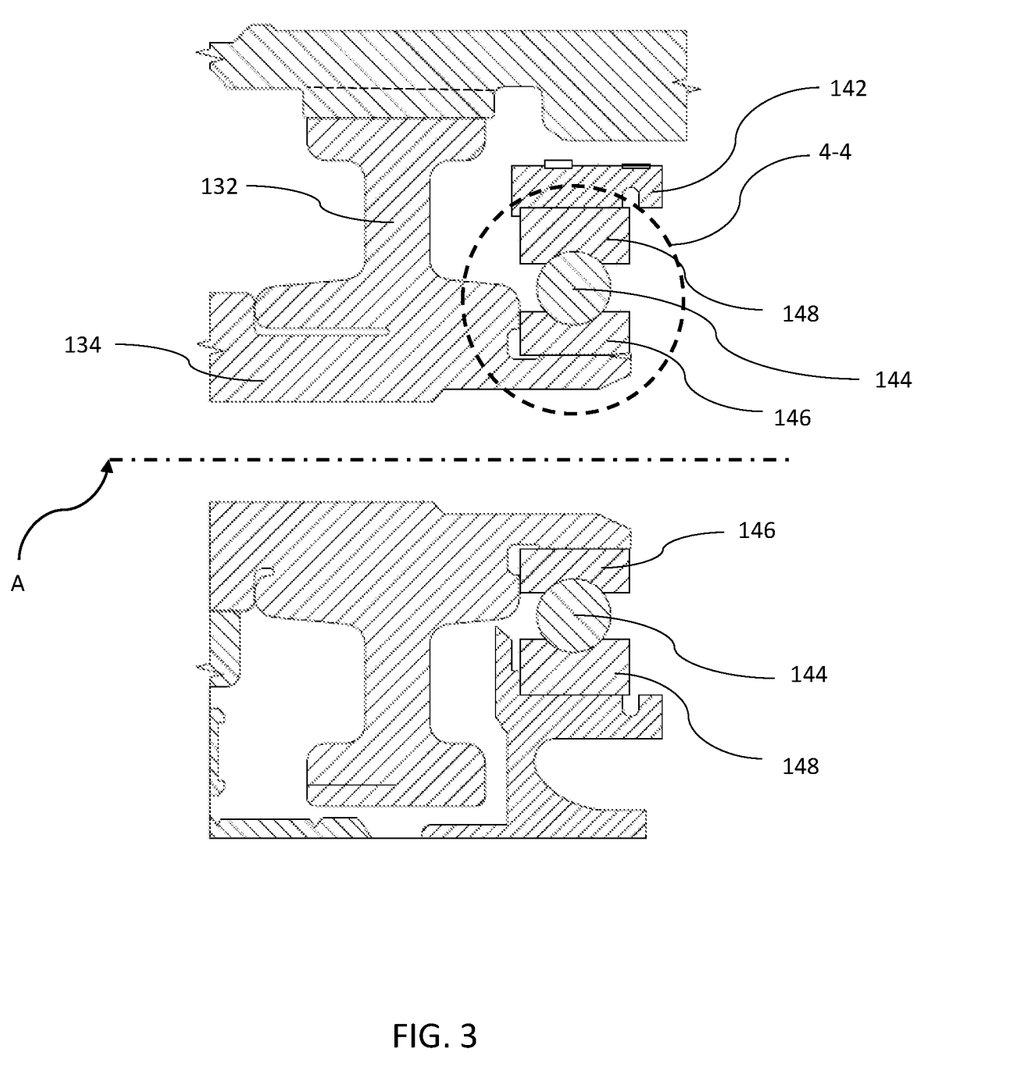
FIG. 3 is an illustration of a detail view of sectional area 3-3 of FIG. 2, according to an exemplary embodiment.

FIG. 3 is an illustration of a detailed view of sectional area 3-3 of FIG. 2 showing an end portion of the torque transmittal shaft 134, or shaft 134 for brevity, supported by the rolling-element bearing 136 to the housing 142 of the gear box 114. The rolling-element bearing 136 is configured to carry a load by placing rolling elements 144 between two concentric grooved rings 146, 148, also referred to as an inner-race 146 and an outer-race 148. The outer-race 148 is located radially further from an axis of rotation-A, also referred to as rotational axis-A, than the inner-race 146. The inner-race 146 and the outer-race 148 are rotatable with respect to one another about the rotational axis-A.

Figure 4:
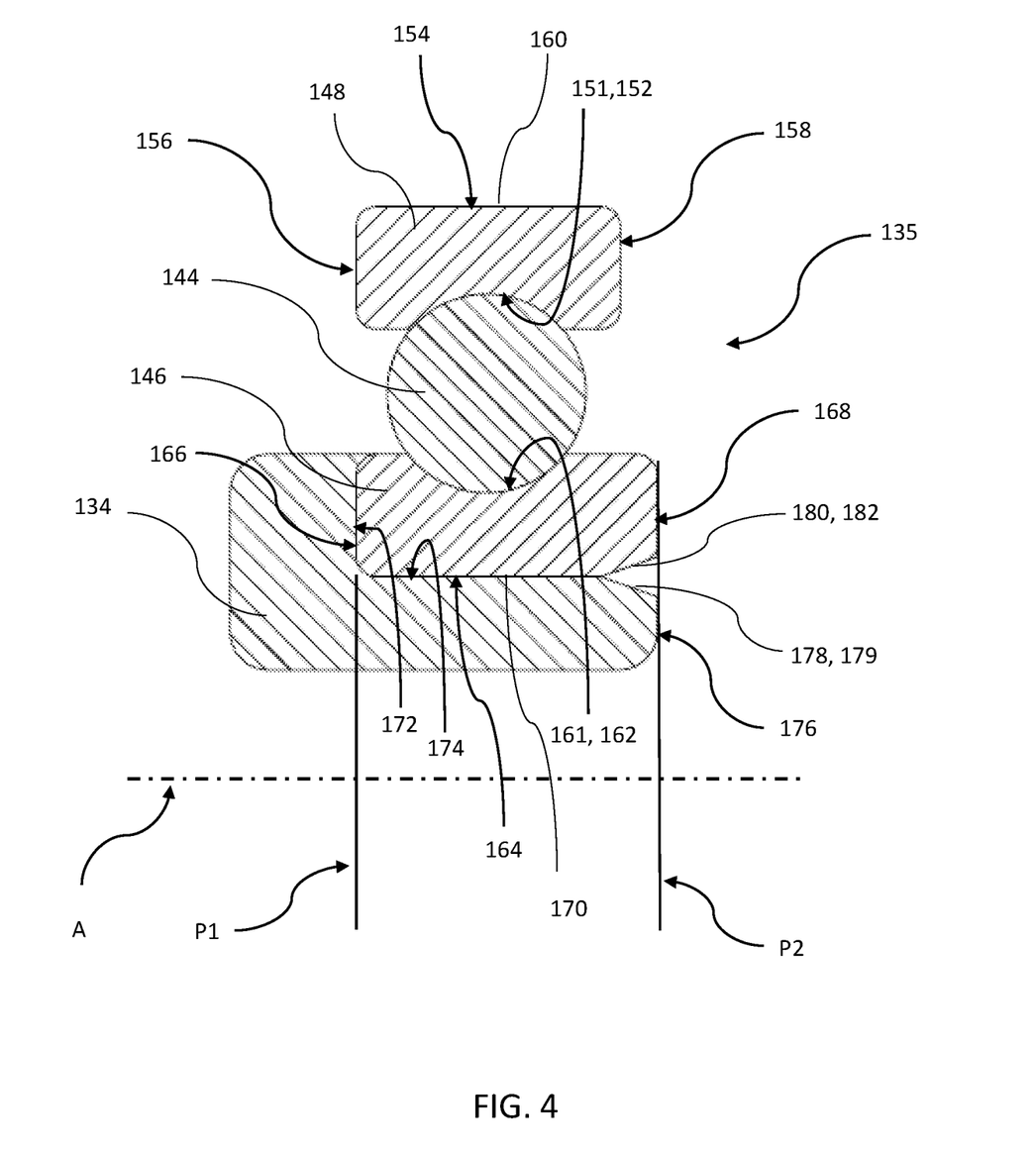
FIG. 4 is an illustration of a detail view of section 4-4 of FIG. 3, according to an exemplary embodiment.
Figure 5:
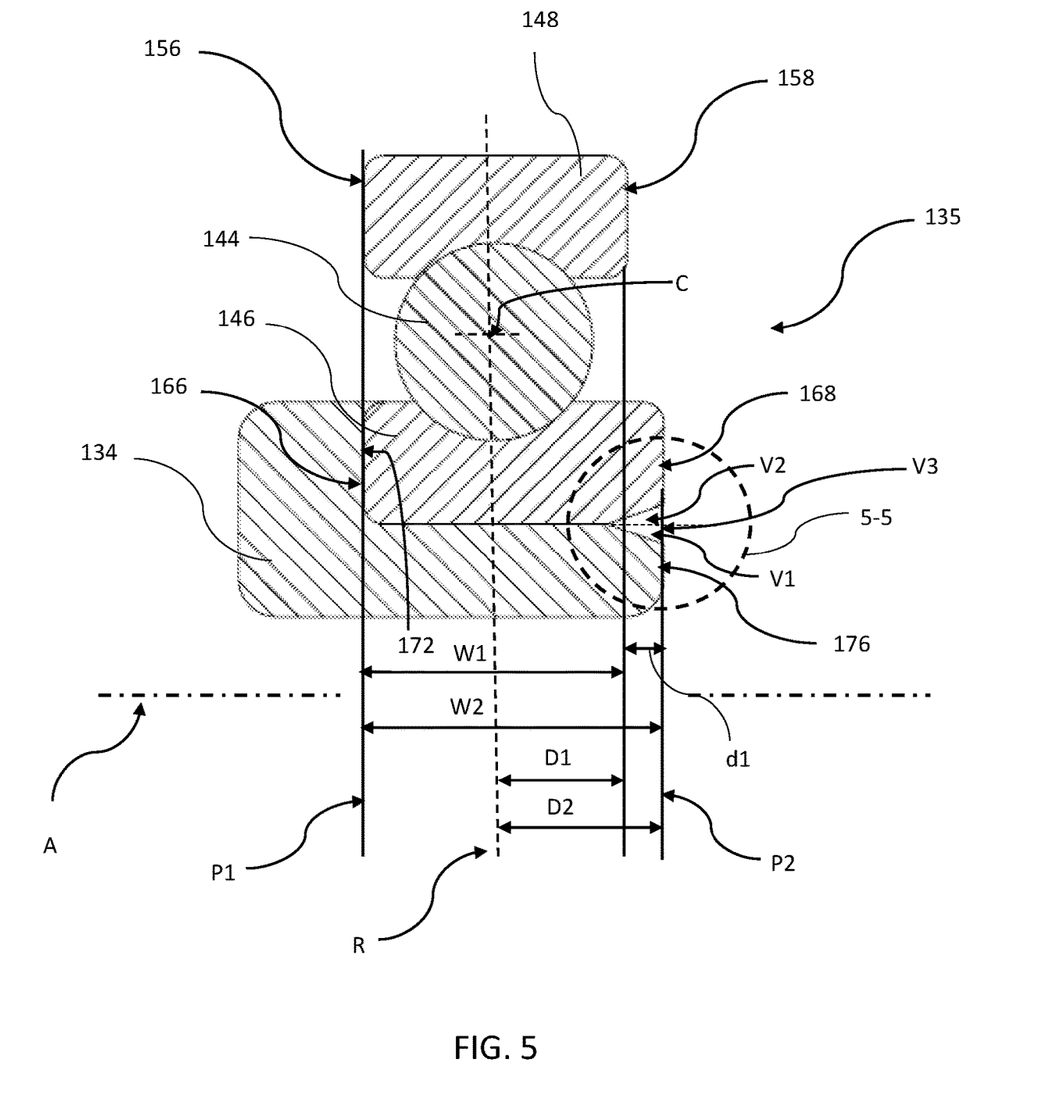
FIG. 5 is another illustration of the detail view of section 4-4 of FIG. 3, according to an exemplary embodiment.

Both FIGS. 4 and 5 are illustrations of the detailed view of sectional area 4-4 of FIG. 3 showing the rolling-element bearing 136 having the inner-race 146 assembled onto the shaft 134 to form a rotatable shaft-bearing assembly 135. In the exemplary embodiment shown, the rolling elements 144 are steel ball bearings 144 held at uniform distances from one another in a circumferential directions between the outer-race 148 and the inner-race 146 by a bearing cage (not shown). It should be appreciated that the rolling elements 144 may also be steel cylindrical bearings or any other types of bearings that allows the inner-race 146 to rotate about the rotational axis-A with respect to the outer-race 148. The outer-race 148 and the inner-race 146 are formed of a high strength steel such as SAE 52100 steel.

Best shown in FIG. 4, the outer-race 148 includes an interior surface 151, defining an outer raceway 152 and an exterior surface 154 opposite the interior surface 151. The exterior surface 154 defines a first annular face 156, a second annular face 158 opposite the first annular face 156, and an outer-race faying surface 160 connecting the first annular face 156 and the second annular face 158. The first annular face 156 and the second annular face 158 of the outer-race 148 are also referred to as the outer-race first annular face 156 and the outer-race second annular face 158, respectively.

Similarly to the outer-race 148, the inner-race 146 includes an interior surface 161 defining an inner raceway 162 and an exterior surface 164 opposite the interior surface 161. The exterior surface 164 defines a first annular face 166, a second annular face 168 opposite the first annular face, and an inner-race faying surface 170 connecting the first annular face 166 and the second annular face 168. The first annular face 166 and the second annular face 168 of the inner-race 146 are also referred to as the inner-race first annular face 166 and the inner-race second annular face 168, respectively.

The inner-race 146 is concentrically assembled to the outer-race 148 such that the inner raceway 162 cooperates with outer raceway 152 to contain the rolling elements 144. A single row of rolling elements 144 is disposed between the inner raceway 162 and the outer raceway 152. The rolling elements 144 are sized to provide direct metal-to-metal contact between the outer raceway 152 and the inner raceway 162.

Best shown in FIG. 5, in one embodiment, the first annular face 156 of the outer-race 148 is co-planar with the first annular face 166 of the inner-race 146 on plane P1. The outer-race 148 includes a first width W1 measured from the first annular face 156 to the second annular face 158 in an axial direction parallel with the rotational axis-A. The inner-race 146 includes a second width W2 measured from the first annular face 166 to the second annular face 168 in the axial direction parallel with the rotational axis-A. In the example shown, W2 is greater than 0 to about 10 millimeters (mm) wider than W1, therefore the second annular face 168 of the inner-race 146 extends a distance (d1) from greater than 0 to about 10 mm further than the second annular face 158 of the outer-race 148 in an axial direction parallel with the axis of rotation-A.

Still referring to FIG. 5, in another embodiment, a radial axis-R is shown extending perpendicular from the axis of rotation-A through a geometric center (C) of the rolling element 144. The rolling-element bearing 136 includes a first distance D1 measured from the radius-R to the second annular face 158 of the outer-race 148 in the axial direction parallel with the rotational axis-A. The rolling-element bearing 136 includes a second distance D2 measured from the radius-R to the second annular face 168 of the inner-race 146 in the axial direction parallel with the rotational axis-A. The second distance D2 is greater than the first distance D1 by greater than 0 mm to about 10 mm. In other words, the second annular face 168 of the inner-race 146 extends 0 mm to 10 mm further than the second annular face 158 of the outer-race 148 in the axial direction. In this embodiment, the first annular face 156 of the outer-race 148 and the first annular face 166 of the inner-race 146 do not need to be on the same plane P1.

Best shown in FIG. 4, the shaft 134 includes an annular surface 172 extending on the plane P1 perpendicular to the axis of rotation-A, an external cylindrical faying surface 174 extending from the annular surface 172 in the direction parallel with the axis of rotation A, and a distal end surface 176 extending perpendicular from the external cylindrical faying surface 174. The inner-race 146 is assembled onto the shaft 134 to form a torque shaft-bearing assembly 135 such that the faying surface 170 of the inner-race 146 forms an interference fit with the external cylindrical faying surface 174 of the shaft 134. The inner-race 146 is disposed on the shaft 134 such that the first annular face 166 of the inner-race 146 is abutted against the annular surface 172 of the shaft 134 and the faying surface 170 of the inner-race 146 is in tight contact with the external cylindrical faying surface 174 of the shaft 134. The distal end surface 176 of the shaft 134 is coplanar with the second annular face of the inner-race 146 on a plane P2.

The shaft 134 includes a shaft annular beveled edge 178 defined by an angled surface 179 extending from the faying surface 174 of the shaft 134 to the distal end surface 176 of the shaft 134. The angled surface 179 and the faying surface 174 are also referred to as the shaft angled surface 179 and the shaft faying surface 174, respectively. The cross section of the shaft annular beveled edge 178 defines a half-V shaped notch V1, also referred to as a half-V shaped groove V1. The inner-race 146 includes an inner-race annular beveled edge 180 defined by an inner-race angled surface 182 extending from the faying surface 170 of the inner-race 146 to the second annular face 168. The cross section of the inner-race annular beveled edge 180 define a half-V shaped notch V2, also referred to as a half-V shaped groove V2. The inner-race annular beveled edge 180 cooperates with the shaft annular bevel edge 178 to define an annular V-shaped notch V3, also referred to as a V-shaped groove V3, in a distal end of the rotatable shaft-bearing assembly 135. The half-V shaped notch V1 on the shaft together with the extended distance d1 of the inner-race 146 enhance heat dissipation toward the shaft 134 and to avoid overheating the inner-race 146 during a laser welding process.

Figure 6:
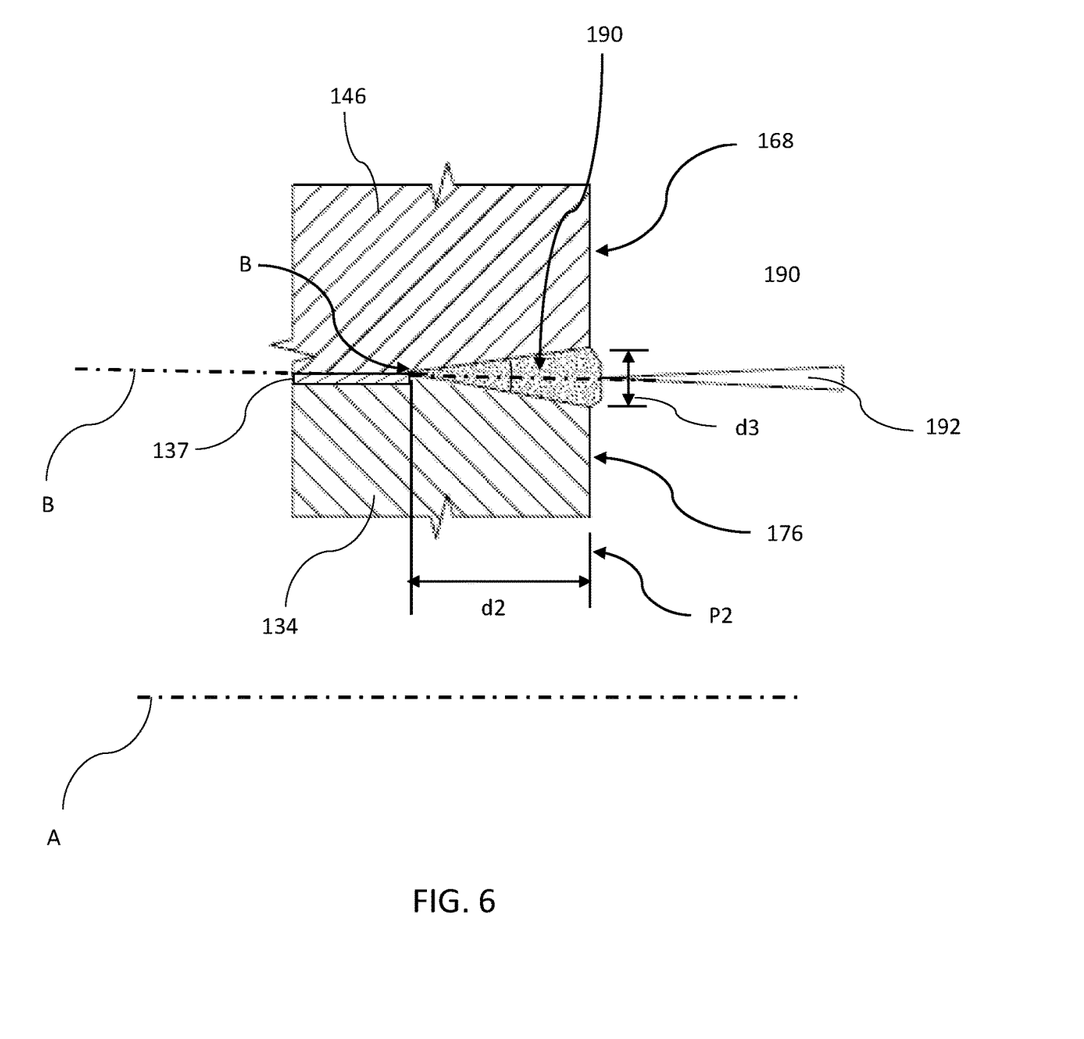
FIG. 6 is an illustration of a detail view of section 5-5 of FIG. 4, according to an exemplary embodiment.

FIG. 6 shows a detailed view of section 5-5 of FIG. 5. A weld joint 190 is formed in the annular V-shaped notch joining the inner-race 146 to the shaft 134. An outer carburized layer 137 of the shaft 134 is removed during the process of forming the shaft annular beveled edge 178. A bottom B of the V-shaped notch is defined at the intersection of the shaft angled surface 179 and the inner-race angled surface 182. An axis B is shown extending from the bottom B in a direction parallel with the axis of rotation-A. The annular V-shaped notch includes a depth (d2) of between of between 1 to 5 mm as measured from bottom B of the V-shaped notch to the plane P along the B-axis. The annular V-shaped notch also includes a width (d3) of greater than 0 to about 3 mm as measured from the second annular face 168 of the inner-race 146 to the distal end surface 176 of the shaft 134 on plane P2.

Figure 7:
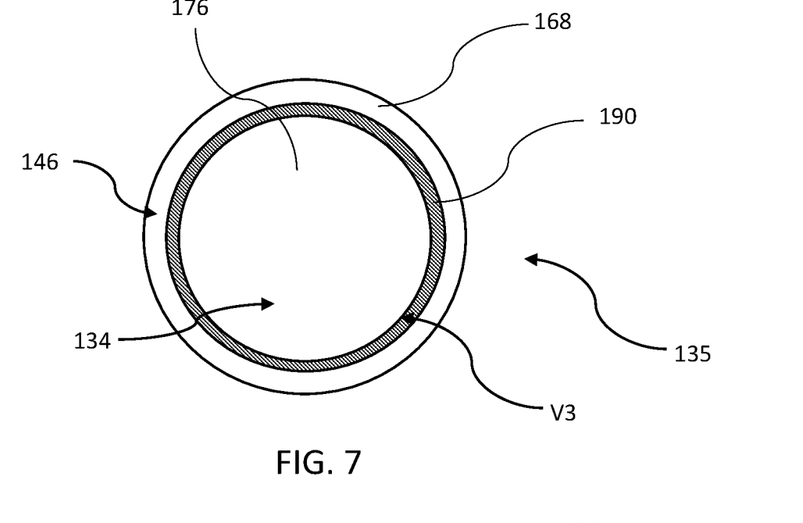
FIG. 7 is an illustration of an end view a shaft-bearing assembly having an inner-race of a rolling-element bearing welded to the torque transfer shaft, according to an exemplary embodiment.

FIG. 7 shows an end view of the shaft-bearing assembly 135 having the inner-race 146 joined to the shaft 134 with a completed weld joint 190 formed in the V-shaped groove V3. The completed weld joint 190 is created with a high nickel content weld filler material, having greater than 10 weight percent nickel, into the V-shaped weld groove to fuse the inner-race 146 with the shaft 134 using a welding power source such as a laser welding beam or arc welding gun. The high nickel content filler metal composition is selected to produce a ductile fusion zone between the high strength inner race and carburized shaft steel to relax weld stresses induced by the fast heating and cooling laser welding process and welding induced cracking.

It should be appreciated that while a V-shaped groove V3 is depicted, the assembly 135 may have a half-V shaped groove when either of the inner-race 146 or the shaft 134 includes a beveled edge. It is preferred that the half-V shaped groove is present on the shaft 134. The half-V shaped groove V1 on the shaft 134 enhances heat dissipation toward shaft 134 side and avoids overheating the inner-race 146. The beveled edges on the shaft 134 and the inner-race 146 may be formed by cutting or grinding operations to remove material from the respective edges.

The welding power source 192 directs an arc, a plasma beam or a laser beam, hereinafter referred to generally as laser beam toward into the V-shaped or half-V shaped grooves. The laser beam may be oriented substantially parallel to the axis B or oriented angularly with respect to the axis-B. The laser beam may be oriented at an angle ranging between approximately 5 degrees to approximately 40 degrees with respect to the axis-B with respect to the surface A or the surface B.

Figure 8:
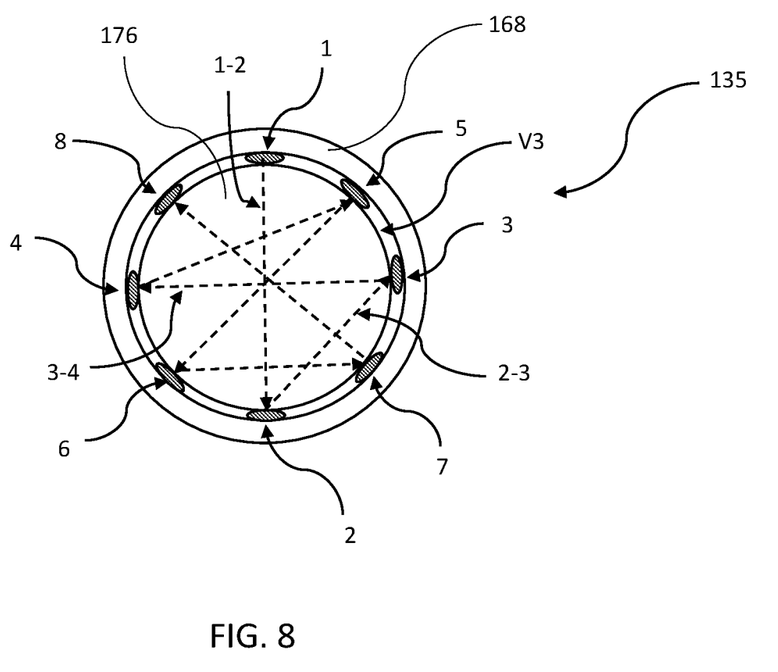
FIG. 8 is an illustration of a predetermined sequence of welding the inner race to the torque transfer shaft, according to an exemplary embodiment.

FIG. 8 shows an end view of the shaft-bearing assembly 135 having an annular V-shaped groove V3 defined by a beveled edge of the inner-race 146 and beveled edge of the shaft 134. A plurality of individual weld segments 1-8 are formed at uniform distances from one another in a circumferential directions in the annular V-shaped groove V3. Individual weld segments are formed in a predetermined sequence within the V-shaped groove V3 to join the inner-race 146 to the shaft 134. The predetermined sequence is configured to minimize weld stress and potential distortion of the rolling-element bearing 136. In the example shown, a plurality of weld segments 1-8 are formed in the V-shaped groove V3 to join the shaft 134 to the rolling-element bearing 136. The weld segments 1-8 are formed in a criss-cross pattern, also known a star pattern sequence, in which each subsequent weld segment is formed across a chord from the previous weld segment and the subsequent weld segment is not immediately adjacent the previous weld segment. A chord is a line connecting two weld segments on the circumference of the joint defined on the end surfaces of the inner-race 146 and the shaft 134.

In the example shown, weld segments are formed in the sequence order of 1 through 8 as shown in FIG. 8. The first weld segment 1 is formed first followed by the second weld segment 2 formed across a chord 1-2 (shown as an arrow 1-2) from the first weld segment 1, followed by the third weld segment 3 across chord 2-3 from the second weld segment 2, followed by the fourth weld segment 4 across chord 3-4 from the third weld segment 3, and so on and so forth until all eight weld segments are formed. While eight weld segments are depicted, it should be appreciated that the total number of weld segments may be more or less than the eight weld segments shown.

It should also be appreciated that while the vehicle 100 is depicted as a passenger car, other examples of vehicles include, but are not limited to, land vehicles such as motorcycles, trucks, sport utility vehicles (SUVs), and recreational vehicles (RVs), and non-land vehicles including marine vessels and aircrafts. It should be further appreciated that a gear box for an electric vehicle is described, the disclosure of the gear box and components such as the shaft 134 supported by rolling-element bearings 136 are also applicable to those on conventional internal combustion vehicles and hybrid-vehicles having a transmission.

Numerical data have been presented herein in a range format. The term "about" as used herein is known by those skilled in the art. Alternatively, the term "about" includes +/−0.05% of the stated value. It is to be understood that this range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

The invention claimed is:

1. A gear box for a vehicle, comprising:
a housing;
a rolling-element bearing comprising:
an inner-race having an inner-race first annular face, an inner-race second annular face opposite the inner-race first annular face, and an inner-race faying surface connecting the inner-race first annular face to the inner-race second annular face;
an outer-race having an outer-race first annular face, an outer-race second annular face opposite the outer-race first annular face, and an outer-race faying surface connecting the outer-race first annular face to the outer-race second annular face, wherein the outer-race is concentric with the inner-race and the outer-race faying surface is joined to the housing;

a rolling element disposed between the outer-race and the inner-race, wherein the rolling element includes a geometric center; and a first distance (D1) between the geometric center to the outer-race second annular face and a second distance (D2) between the geometric center to the inner-race second annular face, wherein D2 is greater than D1; and a shaft comprising a shaft faying surface, a distal end surface extending perpendicularly from the shaft faying surface, and a shaft angled surface extending from the shaft faying surface to the distal end surface to define a shaft annular beveled edge;

wherein the shaft faying surface is in contact with the inner-race faying surface, and the inner-race second annular face is coplanar with the distal end surface;

wherein the shaft annular beveled edge cooperates with the inner-race faying surface to define a half-V shaped groove; and a laser weld joint formed in the half-V shaped groove to join the shaft to the inner-race;

wherein the inner-race is formed of a high hardness steel;

wherein the shaft is a carburized shaft; and wherein an outer carburized layer of the shaft is removed to define the shaft annular beveled edge.

2. The gear box of claim 1, wherein:

the outer-race first annular face is coplanar with the inner-race first annular face;

the outer-race includes a first width (W1) and the inner-race includes a second width (W2); and W2 is wider than W1 by greater than 0 millimeters (mm) to about 10 mm.

3. The gear box of claim 1, wherein D2 is greater than D1 by greater than 0 mm to 10 mm.

4. The gear box of claim 1, wherein:

the inner-race includes an inner-race angled surface extending from the inner-race faying surface to the inner-race second annular face to define an inner-race annular beveled edge;

the shaft annular beveled edge cooperating with the inner-race annular beveled edge to define a V-shaped groove; and the laser weld joint is formed in the V-shaped groove to join the shaft to the inner-race.

5. The gear box of claim 4, wherein the V-shaped groove includes a depth of about 1 mm to about 5 mm.

6. The gear box of claim 5, wherein the V-shaped groove includes a width of greater than 0 mm to about 3 mm.

7. The gear box of claim 4, wherein the laser weld joint includes a plurality of uniformly circumferentially spaced weld segments formed in a predetermined sequence configured to minimize weld stress and potential distortion of the rolling-element bearing.

8. The gear box of claim 7, wherein the laser weld joint comprises a welding alloy having greater than 10 weight percent of nickel.

9. The gear box of claim 8, further comprising an electric motor having a rotor shaft operable to transfer torque to the shaft.

10. A method of welding a rolling-element bearing to a shaft comprising:

providing the shaft having an annular surface perpendicular to a rotational axis-A of the shaft, an external cylindrical surface extending from the annular surface in a direction parallel to the rotational axis-A, a distal end surface extending from the external cylindrical surface parallel to the annular surface, and an angled surface extending from the external cylindrical surface to the distal end surface to define a shaft annular beveled edge;

providing the rolling-element bearing having:

an inner-race including an external surface defining a first annular face, a second annular face opposite the annular first face, and an inner-race faying surface connecting the first annular face to the second annular face, and an outer-race having an outer-race first annular face, an outer-race second annular face opposite the outer-race first annular face, and an outer-race faying surface connecting the outer-race first annular face to the outer-race second annular face, wherein the outer-race is concentric with the inner-race and the outer-race faying surface is joined to a housing; and assembly the rolling-element bearing to the shaft such that the inner-race faying surface is in intimate contact with the external cylindrical surface of the shaft and the second annular face of the inner-race is coplanar with the distal end surface of the shaft;

wherein the shaft annular beveled edge cooperates with the inner-race faying surface to define an annular half-V shaped groove;

forming a laser weld joint in the annular half-V shaped groove to join the shaft to the inner-race;

wherein the rolling-element bearing further includes:

a rolling element disposed between the outer-race and the inner-race, wherein the rolling element includes a geometric center, and a first distance (D1) between the geometric center to the outer-race second annular face and a second distance (D2) between the geometric center to the inner-race second annular face, wherein D2 is greater than D1;

wherein the inner-race is formed of a high hardness steel;

wherein the shaft is a carburized shaft; and removing an outer carburized layer of the shaft to define the shaft annular beveled edge prior to forming the laser weld joint.

11. The method of welding a rolling-element bearing to a shaft of claim 10, wherein forming the laser weld joint in the annular half-V shaped groove includes fusing a welding alloy having greater than 10 percent by weight of nickel to the shaft and inner-race.

12. The method of welding a rolling-element bearing to a shaft of claim 11, wherein:

the inner-race further comprises an inner-race angled surface extending from the inner-race faying surface to the inner-race second annular face to define an inner-race beveled edge;

wherein the inner-race beveled edge cooperates with the shaft annular beveled edge to define an annular V-shaped groove; and wherein forming the laser weld joint includes forming the laser weld joint in the annular V-shaped groove.

13. The method of welding a rolling-element bearing to a shaft of claim 12, wherein forming the weld laser joint in the annular V-shaped groove includes forming a plurality of equally spaced weld segments in a criss-crossing sequence configured to minimize weld stress and potential distortion of the rolling-element bearing.

14. A shaft-bearing assembly comprising:
a carburized steel shaft rotatable about an axis-A, wherein the shaft includes an external faying cylindrical shaft surface extending in a direction parallel to the axis-A, a distal end shaft surface extending from the external faying cylindrical shaft surface in a direction perpendicular to the axis-A, and a shaft angled surface extending from the external faying cylindrical surface to the distal end shaft surface to define an annular beveled shaft edge, wherein the annular beveled shaft edge is free of a carburized layer;
a rolling-element bearing comprising:
an inner-race having an external surface defining a first annular face, a second annular face opposite the first annular face, and an inner-race faying surface connecting the first annular face to the second annular face, wherein the inner-race comprises of a high-strength steel,
an outer-race having an outer-race first annular face, an outer-race second annular face opposite the outer-race first annular face, and an outer-race faying surface connecting the outer-race first annular face to the outer-race second annular face, wherein the outer-race is concentric with the inner-race and the outer-race faying surface is joined to a housing of a gearbox,
a rolling element disposed between the outer-race and the inner-race, wherein the rolling element includes a geometric center;
a first distance (D1) between the geometric center to the outer-race second annular face and a second distance (D2) between the geometric center to the inner-race second annular face, wherein D2 is greater than D1;
wherein the inner-race faying surface is in intimate contact with the external faying cylindrical shaft surface and the second annular face of the inner-race is coplanar with the distal end shaft surface;
wherein the annular beveled shaft edge cooperates with the inner-race faying surface to define a half-V shaped annular groove; and
a laser weld joint formed in the annular half-V shaped groove joining the shaft to the inner-race;
wherein the inner-race is formed of a high hardness steel;
wherein the shaft is a carburized shaft; and wherein an outer carburized layer of the shaft is removed to define the shaft annular beveled edge.

15. The shaft-bearing assembly of claim 14, wherein the rolling-element bearing further comprising:
wherein the second annular face of the inner-race extends in a direction parallel to the axis-A by a distance (d1) beyond the second annular face of the outer-race, wherein the distance (d1) is greater than 0 millimeters (mm) to 10 mm.

16. The shaft-bearing assembly of claim 15, wherein the first annular face of the outer-race is co-planar with the first annular face of the inner-race.

17. The shaft-bearing assembly of claim 14, wherein D2 is greater than D1 by greater than 0 millimeters to 10 millimeters.

18. The shaft-bearing assembly of claim 15, wherein inner-race includes an inner-race angled surface extending from the inner-race faying surface to the inner-race second annular face to define an annular beveled inner-race surface;
wherein the annular beveled inner-race surface cooperates with the annular beveled shaft edge to define an annular V-shaped groove; and
a plurality of equality spaced laser weld joints formed in the V-shaped annular groove to join the shaft to the inner-race of the rolling-element bearing.

19. The gear box of claim 7, wherein the predetermined sequence is a star pattern, wherein the weld segments are formed in a criss-cross pattern such that each subsequent weld segment is formed across a chord from the previous weld segment and the subsequent weld segment is not immediately adjacent the previous weld segment.

20. The gear box of claim 1, wherein the inner-race comprises of a SAE 52100 steel.

* * * * *